3,255,175
N-ACETYL-3,4-ISOPROPYLIDENE-1-DEOXYLINCOSAMINE

Herman Hoeksema, Cooper Township, Kalamazoo County, Mich., assignor to The Upjohn Company, Kalamazoo, Mich., a corporation of Delaware
No Drawing. Filed Apr. 13, 1964, Ser. No. 359,450
1 Claim. (Cl. 260—210)

The present invention relates to a novel compound and is more particularly concerned with N-acetyl-3,4-O-isopropylidene-1-deoxylincosamine (or by another trivial name referred to as N-acetyl-3,4-O-isopropylidene-1,5-anhydrolincosaminol) [6-acetamido-1,5-anhydro-6,8-dideoxy - 3,4 - O - isopropylidene - D - erythro - D-galacto-octitol] (II) and a method for the preparation thereof.

The novel compound of this invention and the process for the production thereof can be illustratively represented in the following manner:

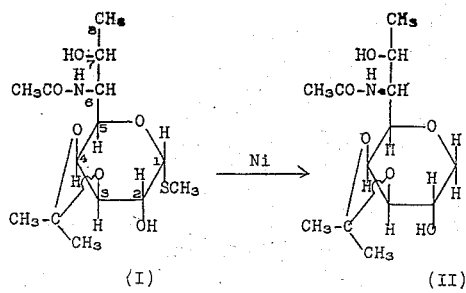

The process of the present invention comprises: heating methyl N - acetyl - 3,4 - O - isopropylidenethiolincosaminide (I) with excess of Raney nickel in a lower alkanol such as methanol, ethanol, 1-propanol, 2-propanol, 1-butanol, t-butyl alcohol, and the like, to give N-acetyl-3,4 - O - isopropylidene - 1 - deoxylincosamine (II).

The novel compound, N - acetyl - 3,4 - O - isopropylidene-1-deoxylincosamine, is an important intermediate in the preparation of pharmacologically active products. For example, N - acetyl - 3,4 - O - isoporpylidene - 1-deoxylincosamine (II) can be treated with methyl iodide to give N - acetyl - 3,4 - O - isopropylidene - 7 - O - methyl - 1 - deoxylincosamine (III), which is highly active against *Trichophyton rubrum*, *Pseudomonas fluorescens*, and other microorganisms. The antimicrobial activity of N - acetyl - 3,4 - isopropylidene - 7 - O - methyl - 1 - deoxylincosamine can be utilized for washing equipment in hospitals, homes, and microbiological laboratories and for washing medical and surgical instruments as well as clothing used in laboratories specializing in the cultivation of microorganisms. Also, in such locations where sterile backgrounds are necessary, floors, walls and ceilings can be washed with aqueous solutions of these compounds.

The starting material, methyl N-acetyl-3,4-O-isopropylidenethiolincosamine, is a novel starting material and is produced as shown in the preparations.

In carrying out the process of the present invention, methyl N - acetyl - 3,4 - O - isopropylidenethiolincosaminide is refluxed in a lower alkanol with an excess of an active nickel catalyst, advantageously a commercially available grade of Raney nickel. The lower alkanol is preferably ethanol, however methanol, 1-propanol, 2-propanol, 1-butanol, 2-butanol, t-butyl alcohol, and the like can be used. The nickel catalyst is generally used in excess, amounts from about 5 to 50 times the weight of the starting material (I) being used.

After the reaction is terminated, the product is recovered by conventional means, e.g., removal of the nickel catalyst by filtration, and evaporation of the solvent. The product thus obtained is purified by conventional procedures, extraction, recrystallization, countercurrent distribution and the like.

The following preparations and examples are illustrative of the process and products of the present invention, but are not to be construed as limiting.

PREPARATION 1

*Methyl thiolincosaminide*

A solution of 4 g. of lincomycin [U.S. Patent 3,086,-912] in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled, acetonitrile was added, and the mixture was stirred until the crystals were suspended. The crystals were collected on a filter, washed with acetonitrile and with ether. The yield of white, crystalline methyl thiolincosaminide after drying in vacuo at room temperature was 2.1 g. (84%). Recrystallization was accomplished by dissolving methyl thiolincosaminide in hot dimethylformamide and adding an equal volume of ethylene glycol dimethyl ether.

Methyl thiolincosaminide has the following physical and chemical characteristics:

Melting point: 225–228° C.
Optical Rotation: $[\alpha]_D^{25}$ +276° (c.=0.768 in water)
Titration: pKa'=7.45

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

PREPARATION 2

*Methyl N-acetylthiolincosaminide*

Five grams of methyl thiolincosaminide (about 0.02 mole) was suspended with stirring in 50 ml. of methanol and treated with 4.04 g. (about 0.04 mole) of acetic anhydride. The starting material dissolved almost completely, and thereafter the mixture became solid. After 18 hours at room temperature (about 25° C.), the solid was filtered, washed with methanol, and dried in a vacuum oven at 50° C. and 15 mm. pressure; yield, 4.58 g. (79%) of crystalline product melting at 242–245° C. This product was recrystallized from absolute methanol to give colorless needles of methyl N-acetylthiolincosaminide having a melting point of 243–245° C. and a rotation, $[\alpha]_D^{25}$ ($H_2O$) of +265°, c.=0.7374; and $[\alpha]_D^{25}$ 95% ethanol of +248°, c.=0.6124.

The thus-obtained methyl N-acetylthiolincosaminide had the following analysis:

*Analysis.*—Calcd. for $C_{11}H_{21}O_6NS$: C, 44.72; H, 7.17; N, 4.74; S, 10.85. Found: C, 44.87; H, 7.10; N, 4.65; S, 10.99.

In the manner shown in Preparation 2, other acyl derivatives of methyl thiolincosaminide can be made, using other anhydrides of other acids such as propionic anhydride, butyric anhydride, valeric anhydride, hexanoic anhydride, benzoic anhydride, phenylacetic anhydride, phenylpropionic anhydride and the like. Representative methyl N-acylthiolincosaminides thus obtained include the methyl N-propionyl-, N-butyryl-, N-valeryl-, N-hexanoyl-, N-benzoyl-, N-phenylacetyl-, N-phenylpropionylthiolincosaminide, and the like.

PREPARATION 3

*Methyl N-acetyl-3,4-O-isopropylidenethiolincosaminide*

A suspension of 5.3 g. of finely powdered methyl N-acetylthiolincosaminide was stirred for 60 hours at room temperature with 500 ml. of acetone and 0.5 ml. of concentrated sulfuric acid. Most of the starting material was still undissolved at this time, so an additional 5 ml. of concentrated sulfuric acid was added; solution quickly resulted. The solution was stirred for 30 minutes at room temperature and added to a suspension of 150 g. of barium carbonate in 100 ml. of water. The mixture was stirred until neutral, barium sulfate and excess carbonate were removed by filtration, and the precipitate was washed with acetone. The filtrate and washings were combined and evaporated to dryness in vacuo at 50° C. to give a residue. The residue was treated with acetone-ether (10:1) and insoluble materials were removed by filtration. The filtrate was evaporated to dryness and the residue was dissolved in 100 ml. of ethanol. Removal of the alcohol by heating in vacuo left a yellow gum which was dissolved in 20 ml. of warm water containing a small amount of sodium carbonate. Some insoluble material was removed by filtration, and the filtrate was cooled. The crystals which formed were collected after standing in the refrigerator for 4 hours, washed with cold water, and dried in vacuo; yield of methyl N - acetyl-3,4-O-isopropylidenethiolincosaminide, 2 g. A portion of the crystals, recrystallized from water for analysis, had a melting point of 174–175° C. and a rotation, $[\alpha]_D^{25}$ +189° (c.=0.4136, water).

*Analysis.*—Calcd. for $C_{14}H_{25}NO_6S$: C, 50.2; H, 7.52; N, 4.17; S, 9.55. Found: C, 49.87; H, 7.46; N, 4.11; S, 9.56.

In the manner given in Preparation 3, substitution of methyl N-acetylthiolincosaminide by other methyl N-acylthiolincosaminides results in the corresponding methyl N - acyl - 3,4 - O - isopropylidenethiolincosaminides such as methyl N-propionyl-, N-butyryl-, N-valeryl-, N-hexanoyl-, N-benzoyl-, N-phenylacetyl-, N-phenylpropionyl-3,4-O-isopropylidenethiolincosaminide and the like.

EXAMPLE 1

*N-acetyl-3,4-O-isopropylidene-1-deoxylincosamine*

A quantity (15 g., 0.054 mole) of methyl N-acetyl-3,4-O-isopropylidenethiolincosaminide was heated under reflux for 7 hours with 100 ml. of loosely packed, Raney nickel in 500 ml. of ethanol. The mixture was thereupon filtered and the catalyst was washed with a total of 1 liter of boiling ethanol. The filtrate and washings were combined and evaporated to dryness, leaving a partially crystalline residue. This residue was purified by counter-current distribution, 200 transfers, in a system consisting of 1-butanol:water (1:1). A major fraction, K=0.48, yielded on evaporation a white crystalline solid; melting point, 220–235° C. with decomposition; rotation, $[\alpha]_D$ +70° (c.=150% ethanol). The N-acetyl - 3,4 - O - isopropylidene - 1 - deoxylincosamine had an analysis as follows:

*Analysis.*—Calcd. for $C_{13}N_{23}NO_6$: C, 53.96; H, 8.09; N, 4.84. Found: C, 53.87; H, 8.23; N, 5.67, 4.92.

In similar manner, other methyl N-acyl-3,4-O-isopropylidenethiolincosaminides yield by this process the corresponding N-acyl-3,4-O-isopropylidene - 1 - deoxylincosamines. Representative N-acyl-3,4-O-isopropylidene-1-deoxylincosamines thus produced include: N-propionyl-, N-butyryl-, N-valeryl-, N-hexanoyl-, N-benzoyl-, N-phenylacetyl-, N - phenylpropionyl - 3,4 - O - isopropylidene-1-deoxylincosamine and the like.

I claim:

N - acetyl - 3,4 - O - isopropylidene - 1 - deoxylincosamine of the formula:

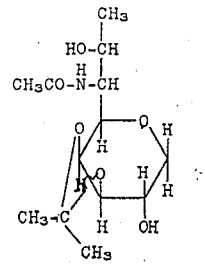

References Cited by the Examiner

Creighton et al., J. Chem. Soc., 1960, pp. 1024–1029.
Hall et al., J. Chem. Soc., 1961, pp. 1537–1545.
Stanek et al., "The Monosaccharides," 1963, p. 374, Academic Press, New York, New York.

LEWIS GOTTS, *Primary Examiner.*
JOHNNIE R. BROWN, *Assistant Examiner.*